United States Patent
Iwasa

(10) Patent No.: US 12,526,519 B2
(45) Date of Patent: Jan. 13, 2026

(54) VIBRATING ELECTRONIC APPARATUS

(71) Applicant: CANON KABUSHIKI KAISHA, Tokyo (JP)

(72) Inventor: Takayuki Iwasa, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 338 days.

(21) Appl. No.: 18/313,604

(22) Filed: May 8, 2023

(65) Prior Publication Data

US 2023/0388631 A1 Nov. 30, 2023

(30) Foreign Application Priority Data

May 24, 2022 (JP) .................................. 2022-084604

(51) Int. Cl.
*H04N 23/68* (2023.01)
*H04N 23/73* (2023.01)

(52) U.S. Cl.
CPC ............. *H04N 23/68* (2023.01); *H04N 23/73* (2023.01)

(58) Field of Classification Search
CPC ........ H04N 23/68; H04N 23/73; H04N 23/51; H04N 23/60; H04N 23/631; H04N 23/663; H04N 23/62; H04N 23/667
See application file for complete search history.

(56) References Cited

U.S. PATENT DOCUMENTS

| | | | |
|---|---|---|---|
| 9,802,225 B2 * | 10/2017 | Houston | B06B 1/16 |
| 11,797,092 B2 * | 10/2023 | Higuchi | A63F 13/92 |
| 2011/0216209 A1 * | 9/2011 | Fredlund | G06F 21/83 348/222.1 |
| 2012/0232780 A1 * | 9/2012 | Delson | A63F 13/285 340/407.1 |
| 2014/0104453 A1 * | 4/2014 | Fujinawa | H04N 23/80 348/222.1 |
| 2021/0018820 A1 * | 1/2021 | Noda | G06F 3/016 |

FOREIGN PATENT DOCUMENTS

JP 2020-005250 A 1/2020

* cited by examiner

*Primary Examiner* — Hung H Lam
(74) *Attorney, Agent, or Firm* — Cowan, Liebowitz & Latman, P.C.

(57) ABSTRACT

An electronic apparatus includes a vibrating unit configured to vibrate to notify a user of a predetermined state, and a grip portion to be gripped by the user. The grip portion includes a first vibration area and a second vibration area each having a transmission structure of vibration generated by the vibrating unit and a non-vibration area having no transmission structure.

15 Claims, 16 Drawing Sheets

VIBRATING ELECTRONIC APPARATUS

BACKGROUND

Technical Field

One of the aspects of the disclosure relates to an electronic apparatus.

Description of Related Art

Some electronic apparatuses such as digital cameras and smartphones having vibration devices have conventionally been known. Japanese Patent Laid-Open No. 2020-5250 discloses an image pickup apparatus that notifies a user by using a vibrating device provided in a grip portion to be held by the user. Thereby, in a situation where silence is required such as imaging in a concert hall or a swing of a golfer at a golf course, the user can be notified without driving noise or notification sound that occurs in operating the electronic apparatus.

The configuration disclosed in Japanese Patent Laid-Open No. 2020-5250 generates vibration using the vibration device, and transmits the vibration to the user by vibrating a housing itself in vibrating a protruding portion of the grip portion. Thus, for example, in a case where the electronic apparatus vibrates during imaging, the electronic apparatus may not acquire a clear image or may not perform proper image stabilization due to the vibration of the electronic apparatus itself.

SUMMARY

One of the aspects of the present disclosure provides an electronic apparatus that is less likely to transmit vibration to its entire housing but can transmit vibration to a plurality of grip positions such as a finger and palm of a user.

An electronic apparatus according to one aspect of the disclosure includes a vibrating unit configured to vibrate to notify a user of a predetermined state, and a grip portion to be gripped by the user. The grip portion includes a first vibration area and a second vibration area each having a transmission structure of vibration generated by the vibrating unit and a non-vibration area having no transmission structure.

An electronic apparatus according to another aspect of the disclosure includes a vibrating unit configured to vibrate to notify a user of a predetermined state, a grip portion to be gripped by the user, a holder configured to hold the vibrating unit, and a damper unit configured to damp vibration generated by the vibrating unit. The holder is engaged with the grip portion via the damper unit. The holder includes a first vibrating portion and a second vibrating portion each configured to transmit the vibration.

Further features of the disclosure will become apparent from the following description of embodiments with reference to the attached drawings.

DESCRIPTION OF THE EMBODIMENTS

Referring now to the accompanying drawings, a detailed description will be given of embodiments according to the disclosure.

First Embodiment

Figure 1A:
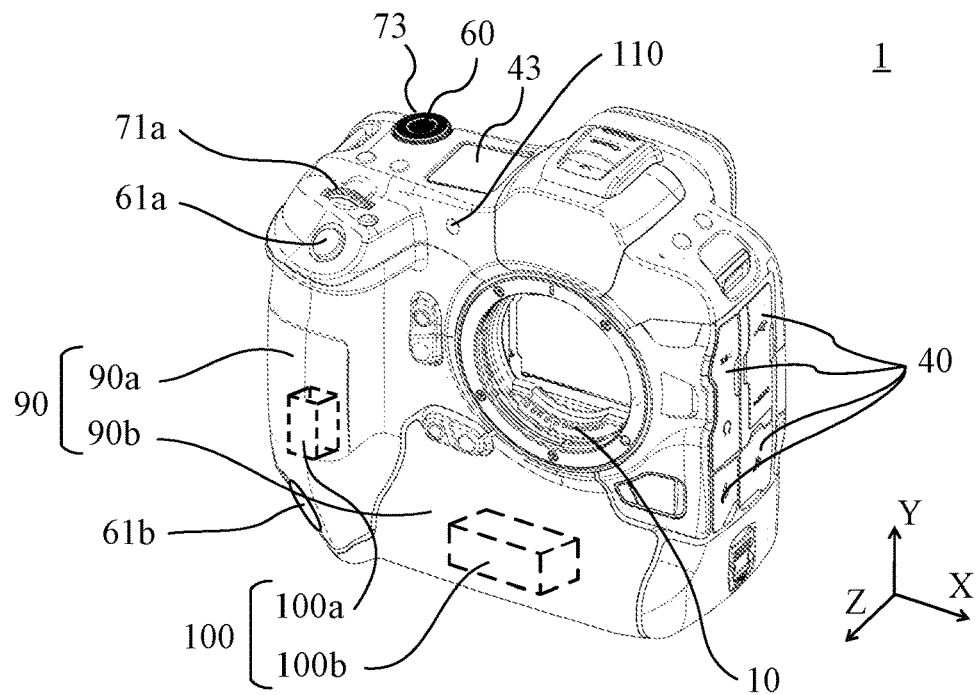
FIGS. 1A to 1C are external views of an image pickup apparatus according to a first embodiment.
Figure 1B:
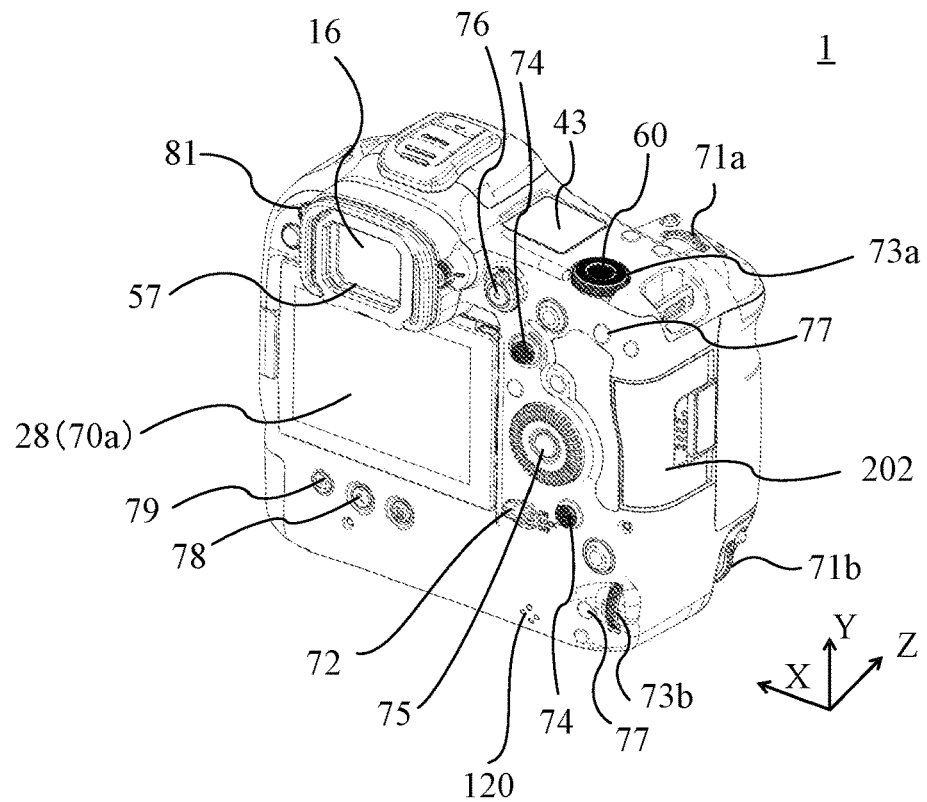
Figure 1C:
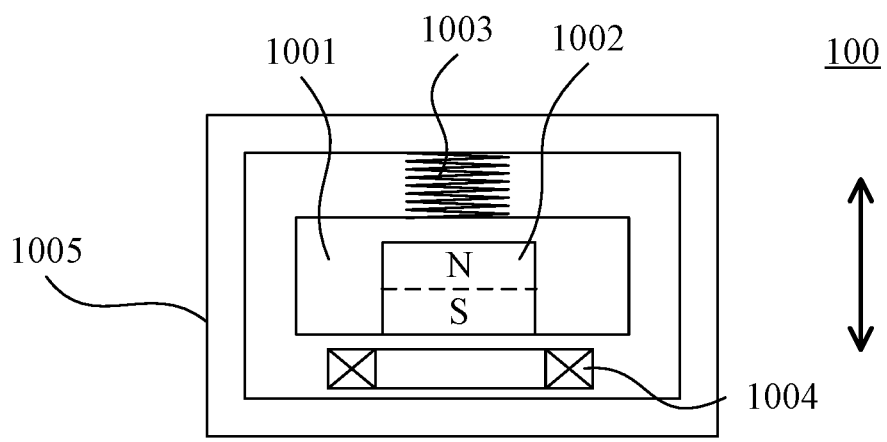
Figure 2:
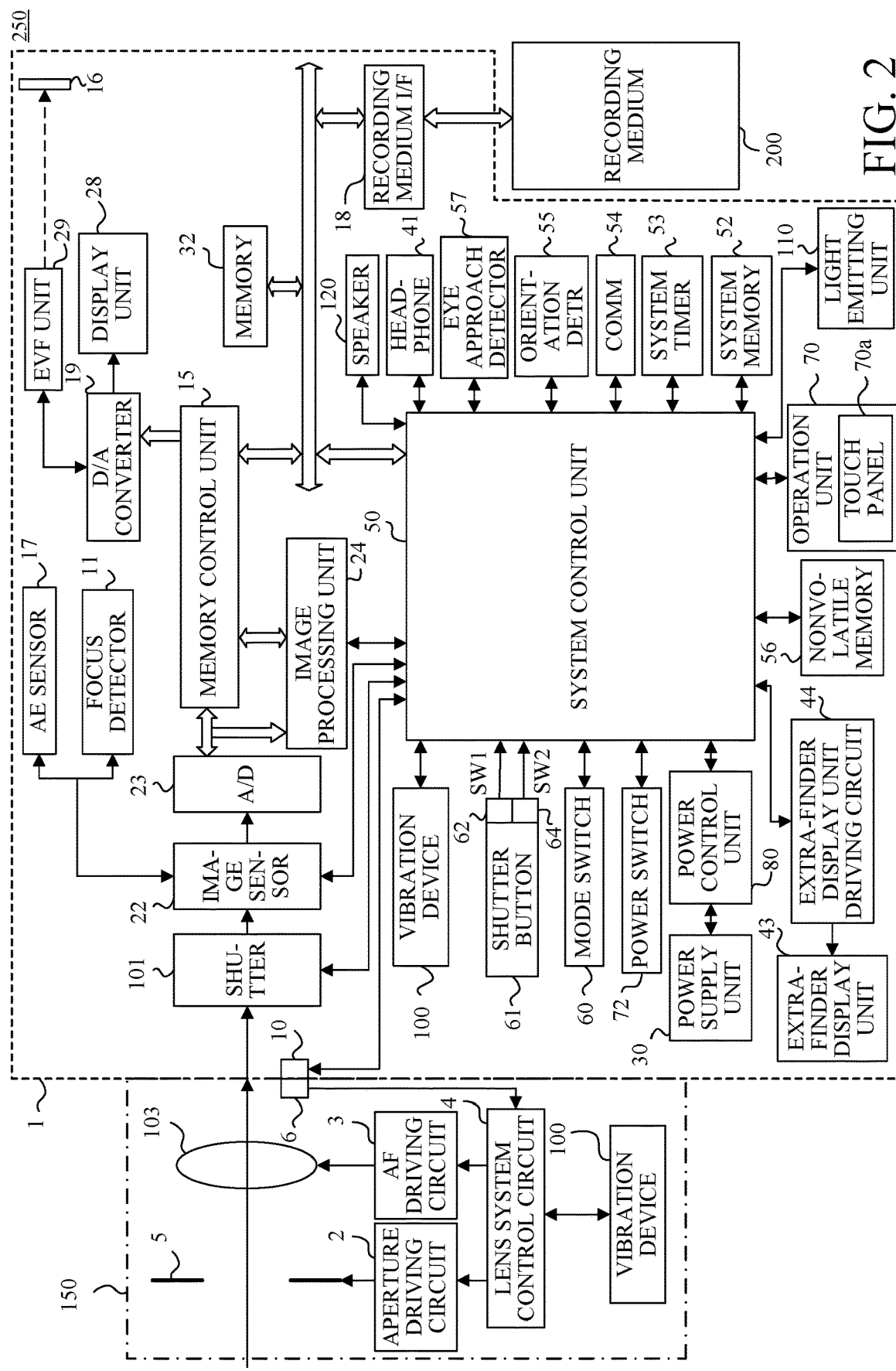
FIG. 2 is a block diagram of an imaging system according to the first embodiment.

Referring now to FIGS. 1A to 2, a description will be given of an image pickup apparatus according to a first embodiment of the disclosure. FIGS. 1A and 1B are external views of an image pickup apparatus (electronic apparatus such as a digital camera) 1. FIG. 1A is a front perspective view. FIG. 1B is a rear perspective view, respectively. FIG. 1C is a structural diagram of a vibration device 100 (vibrating unit). FIG. 2 is a block diagram of an imaging system 250. The imaging system 250 includes the image pickup apparatus (camera body) 1 and a lens apparatus (interchangeable lens) 150 attachable to and detachable from the image pickup apparatus 1. However, this embodiment is not limited to this example, and is applicable to an image pickup apparatus in which a camera body and a lens apparatus are integrated with each other. While the image pickup apparatus (digital camera) is described as an electronic apparatus in this embodiment, it is also applicable to an electronic apparatus other than the image pickup apparatus, such as a smartphone.

In FIG. 1B, the display unit 28 is provided on the rear surface of the image pickup apparatus 1 and displays images and various information. A touch panel 70a can detect a touch operation on the display surface (operation surface) of the display unit 28. An extra-finder display unit 43 is provided on the top surface of the image pickup apparatus 1 and displays various setting values of the image pickup apparatus 1 such as a shutter speed or an aperture value (F-number).

A shutter button (operation member) 61a is an operation unit for instructing imaging, and is a switch having two-step detectors in the pressing direction. The shutter button 61a performs an autofocus (AF) operation when a first-step turning-on is detected, and performs an imaging operation when a second-step turning-on is detected after the shutter button 61a is further pressed from the first step. The customizing function of the shutter button 61a can change the operation of the image pickup apparatus 1 in a case where the first-stage turning-on is detected. For example, auto-exposure (AE) can be operated without operating AF. FIG. 2 illustrates the shutter button 61a and a shutter button 61b, which will be described below, collectively as a shutter button 61.

Alight emitting unit 110 includes an LED element or the like, and emits light at a predetermined timing according to instructions from a system control unit 50. The light emission notifies the user or assists the imaging function of the image pickup apparatus 1.

A mode switch 60 is an operation unit for switching between various modes. A terminal cover 40 is a cover that protects connectors (not illustrated) such as a headphone terminal 41 that connects the external device and the image pickup apparatus 1. By connecting headphones to the headphone terminal 41, electronic sounds generated by the image pickup apparatus 1 can be heard through the headphones. A main electronic dial 71a is a rotary operation member included in the operation unit 70, and turning the main electronic dial 71a and can change a set value such as a shutter speed or an aperture value.

A power switch 72 is an operation member that switches the power of the image pickup apparatus 1 between power-on and power-off. A sub-electronic dial 73 is a rotary operation member included in the operation unit 70, and can move a selection frame, feed images, and the like. A multi-direction key 74 is included in the operation unit 70 and is a multi-direction key (8-direction key) that can be operated in eight directions: up, down, left, right, oblique upper right, oblique lower right, oblique lower left, and oblique upper left, and an operation corresponding to the pressed portion of the multi-direction key 74 is implemented. A SET button 75 is included in the operation unit 70, is a push button, and is mainly used to determine selection items. A moving image button 76 is used to instruct the start and stop of moving image capturing (recording). An AE lock button 77 is included in the operation unit 70, and can be pressed in the imaging standby state to fix the exposure state.

An enlargement button 78 is included in the operation unit 70 and is an operation button for switching between turning-on and turning-off of the enlargement mode in the live-view (LV) display of the imaging mode. Turning on the enlargement mode and then operating the main electronic dial 71a can enlarge or reduce a live-view image. In the playback mode, it functions as an enlargement button for enlarging a played image and increasing an enlargement ratio. A playback button 79 is included in the operation unit 70 and is an operation button for switching between an imaging mode and a playback mode. Pressing the playback button 79 during the imaging mode transitions the mode to the playback mode, and can display on the display unit 28 the latest image among the images recorded on the recording medium 200. A menu button 81 is included in the operation unit 70, and pressing the menu button 81 displays on the display unit 28 a menu screen on which various settings can be made. The user can intuitively perform various settings using the menu screen displayed on the display unit 28 and the multi-direction key 74 and SET button 75.

A camera communication terminal 10 is a communication terminal for the image pickup apparatus 1 to communicate with the lens apparatus 150. The eyepiece portion 16 is an eyepiece portion for an eyepiece finder (peeing type finder), and the user can view an image displayed on an internal electronic viewfinder (EVF) unit 29 through the eyepiece portion 16. An eye approach detector 57 is an eye approach detecting sensor configured to detect whether or not the eye of the user is close to the eyepiece portion 16, and is disposed inside the eyepiece portion 16.

A speaker 120 can reproduce a predetermined electronic sound or a sound of captured moving image data based on an instruction from the system control unit 50. A lid 202 is a lid for a slot in which the recording medium 200 is stored. A grip portion 90 includes a grip portion 90a for holding the image pickup apparatus 1 in an orientation (horizontal direction) illustrated in FIG. 1A and a grip portion 90b for holding the image pickup apparatus 1 in a direction rotated about the Z-axis by 90° from the orientation illustrated in FIG. 1A (longitudinal direction). Since a plurality of grip portions 90a and 90b are thus disposed, the user can change the grip portion according to the imaging style and comfortably capture an image. In this embodiment, the grip portion 90 may include three or more grip portions.

A vibration device is attached to the inner surface of the grip portion 90 and configured to vibrate in order to notify a user of a predetermined state. A vibration device 100a is disposed on the inner surface of the grip portion 90a, and a vibration device 100b is disposed on the inner surface of the grip portion 90b. In this embodiment, the vibration device 100 thus includes a plurality of notifying units (vibration devices 100a and 100b) respectively disposed at positions of a plurality of grip portions (grip portions 90a and 90b), and notifies the user.

The vibration device 100 generates various vibrations according to the predetermined state such as an imaging state, which will be described below, and vibrates the grip portion 90. The vibration device 100 is, for example, a linear resonant actuator (LRA) type, a piezoelectric element type, or a voice coil (VC) motor type vibration device, and can variably set vibration parameters such as a vibration strength (amplitude) or vibration frequency. Various vibration patterns can be generated by changing the vibration parameters.

The shutter button 61a and the main electronic dial 71a are disposed at positions that can be operated with the index finger of the right hand of the user while the user holds the image pickup apparatus 1 by gripping the grip portion 90a with the little finger, ring finger, and middle finger of the right hand of the user. In the same state, the multi-direction key 74 and the sub-electronic dial 73a are disposed at positions to be operated with the thumb of the right hand of the user. The shutter button (operating member) 61b and main electronic dial 71b are disposed at positions to be operated with the index finger of the right hand of the user while the user holds the image pickup apparatus 1 by gripping the grip portion 90b with the little finger, the ring finger, and the middle finger of the right hand of the user. In the same state, the multi-direction key 74 and the sub-electronic dial 73b are disposed at positions to be operated with the thumb of the right hand of the user.

Referring now to FIG. 1C, a description will be given of the LRA type vibration device as an example of the vibration device 100 attached to the grip portion 90. The LRA type vibration device 100 includes a vibrator 1001, a magnet 1002, a spring 1003, a coil 1004, and a base 1005. The vibrator 1001 holds the magnet 1002 and is movably coupled to the base 1005 via the spring 1003. The coil 1004 is placed near the magnet 1002 and electrically connected to a circuit board (not illustrated). The coil 1004 generates an electromagnetic force by receiving a current from the circuit board. The vibrator 1001 reciprocates due to the electromagnetic force and the attraction force or repulsion force with the magnet 1002, and the vibration device 100 vibrates in an arrow direction in FIG. 1C.

While FIG. 2 illustrates that the lens apparatus 150 includes a single lens 103, the lens 103 is usually an imaging optical system including a plurality of lenses. A lens communication terminal 6 is a communication terminal for the lens apparatus 150 to communicate with the image pickup apparatus 1. The camera communication terminal 10 is a communication terminal for the image pickup apparatus 1 to communicate with the lens apparatus 150.

The lens apparatus 150 communicates with the system control unit 50 via the lens communication terminal 6 and the camera communication terminal 10. A lens system control circuit 4 of the lens apparatus 150 controls an aperture stop (diaphragm) 5 via an aperture driving circuit 2 and moves the position of the lens 103 via an AF driving circuit 3 so as to provide focusing. The vibration device 100 is also disposed in the lens apparatus 150 and can generate vibration based on an instruction from the lens system control circuit 4. An AE sensor 17 measures the luminance of the object through the lens apparatus 150. A focus detector 11 outputs defocus amount information to the system control unit 50. Based on this information, the system control unit 50 controls the lens apparatus 150 and performs phase difference AF. The focus detector 11 may be a dedicated phase difference sensor, or may be configured as an imaging-plane phase-difference sensor of the image sensor 22.

A shutter 101 is a focal plane shutter configured to control the exposure time of the image sensor 22 under the control of the system control unit 50. The image sensor 22 is a CMOS sensor, a CCD sensor, or the like, photoelectrically converts an optical image (object image) formed via the imaging optical system (lens 103) and, outputs an electric signal (analog signal). An analog-to-digital (A/D) converter 23 converts the analog signal into a digital signal. The A/D converter 23 is used to convert the analog signal output from the image sensor 22 into the digital signal. An image processing unit 24 performs predetermined pixel interpolation, resizing such as reduction, and color conversion for the data from the A/D converter 23 or the data from a memory control unit 15. The image processing unit 24 also performs predetermined calculation processing using the captured image data. The system control unit 50 performs exposure control and distance measurement control based on the calculation result obtained from the image processing unit 24. Output data from the A/D converter 23 is written in the memory 32 through the image processing unit 24 and the memory control unit 15 or directly via the memory control unit 15.

The memory 32 stores image data obtained from the image sensor 22 and converted into digital data by the A/D converter 23, or image data to be displayed on the display unit 28 or the EVF unit 29. The memory 32 has a storage capacity enough to store a predetermined number of still images, moving images for a predetermined period, and audio data. The memory 32 serves as an image display memory (video memory). A digital-to-analog D/A converter 19 converts image display data stored in the memory 32 into an analog signal and supplies the analog signal to the display unit 28 and the EVF unit 29. Thereby, the image data for display written in the memory 32 is displayed on the display unit 28 or the EVF unit 29 via the D/A converter 19.

The display unit 28 and the EVF unit 29 display on a display unit such as LCD or organic EL according to the analog signal from the D/A converter 19. The extra-finder display unit 43 displays various set values of the image pickup apparatus 1 such as a shutter speed and an aperture value via an extra-viewfinder display unit driving circuit 44. A nonvolatile memory 56 is an electrically erasable/recordable memory and, for example, may use an EEPROM or the like. The nonvolatile memory 56 stores constants and programs for the operation of the system control unit 50.

The system control unit 50 is a control unit that includes at least one processor or circuit, and controls the entire image pickup apparatus 1. The system control unit 50 causes the vibration device 100 to vibrate in accordance with the imaging state of the image pickup apparatus 1 or in a case where the user operates the various operation units described above. The system control unit 50 executes a program recorded in the nonvolatile memory 56 described above, thereby realizing each processing of this embodiment described below. The system memory 52 uses, for example, a RAM, in which constants and variables for the operation of the system control unit 50, programs read out of the nonvolatile memory 56, and the like are developed. The system control unit 50 performs display control by controlling the memory 32, the D/A converter 19, the display unit 28, and the like.

A system timer 53 is a time measuring unit that measures the time used for various controls and the time of the built-in clock. The mode switch 60, a first shutter switch 62, a second shutter switch 64, and the operation unit 70 are operation devices for inputting various operation instructions to the system control unit 50. The mode switch 60 switches the operation mode of the system control unit 50 to any one of a still image capturing mode, a moving image capturing mode, a playback mode, and the like. The still image capturing mode includes an auto imaging mode, an auto scene determination mode, a manual mode, an aperture priority mode (Av mode), a shutter speed priority mode (Tv mode), and a program AE mode (P mode). In addition, there are various scene modes, custom modes, etc., which are imaging settings for each imaging scene. The mode switch 60 allows the user to switch directly to any of these modes. Alternatively, after the user once switches to an imaging mode list screen with the mode switch 60, the user may select one of the plurality of displayed modes, and switches using another operation member. Similarly, the moving image capturing mode may also include a plurality of modes.

The first shutter switch 62 is turned on in a case where the shutter button 61 (61*a*, 61*b*) provided in the image pickup apparatus 1 is pressed midway or half-pressed (imaging preparation instruction), and generates a first shutter switch signal SW1. The imaging preparation operation such as autofocus (AF) processing, auto-exposure (AE) processing, AWB (auto white balance) processing, and flash pre-emission (EF) processing, is started by the first shutter switch signal SW1. The second shutter switch 64 is turned on in a case where the operation of the shutter button 61 is completed, that is, the shutter button 61 is fully pressed (imaging instruction), and generates a second shutter switch signal SW2. In response to the second shutter switch signal SW2, the system control unit 50 starts a series of imaging processing operations from signal reading out of the image sensor 22 to writing of the captured image into the recording medium 200 as an image file. The operation unit 70 is the various operation members as an input unit that receives operations from the user.

A power control unit 80 includes a battery detecting circuit, a DC-DC converter, a switching circuit for switching blocks to be energized, etc., and detects whether or not a battery is installed, the type of battery, and the remaining battery level. The power control unit 80 also controls the DC-DC converter based on the detection result and instruction from the system control unit 50 to supply the required voltage to each unit including the recording medium 200 for the required period. A power supply unit 30 includes a primary battery such as an alkaline battery or a lithium battery, a secondary battery such as a NiCd battery, a NiMH battery, or a Li battery, an AC adapter, or the like.

A recording medium I/F 18 is an interface with a recording medium 200 such as a memory card or hard disk drive. The recording medium 200 is a recording medium such as a memory card for recording captured images, and includes a semiconductor memory, a magnetic disk, or the like. A communication unit 54 is connected wirelessly or by a wired cable, and transmits and receives video signals and audio signals. The communication unit 54 can be connected to a wireless LAN (Local Area Network) and the Internet. The communication unit 54 can communicate with an external device using Bluetooth (registered trademark) or Bluetooth (registered trademark) Low Energy. The communication unit 54 can transmit images (including LV images) captured by the image sensor 22 and images recorded in the recording medium 200, and can receive images and other various information from external devices.

An orientation detector 55 detects an orientation of the image pickup apparatus 1 relative to the gravity direction. Based on the orientation detected by the orientation detector 55, the system control unit 50 can determine whether an image captured by the image sensor 22 is an image captured with the horizontally held image pickup apparatus 1 or a vertically held image captured with the image pickup apparatus 1. The orientation detector 55 can use an acceleration sensor, a gyro sensor, or the like. The orientation detector 55 can also detect the movement of the image pickup apparatus 1 (pan, tilt, lift, whether it is stationary, etc.). The eye approach detector 57 is an eye proximity detecting sensor that detects approach (eye proximity) and separation (eye separation) of the eye (object) to and from the eyepiece portion 16 of the viewfinder (approach detection).

The system control unit 50 switches between display (display state) and non-display (non-display state) of each of the display unit 28 and the EVF unit 29 according to the state detected by the eye approach detector 57. More specifically, at least in the imaging standby state and in a case where the switching of the display destination is automatic, the display destination is set to the display unit 28, the display is turned on, and the EVF unit 29 is not displayed while the eye is separated. While the eye is closely located, the display destination is set to the EVF unit 29, the display is turned on, and the display unit 28 is turned off.

The touch panel 70*a* and the display unit 28 can be integrated with each other. For example, the touch panel 70*a* is configured so that the light transmittance does not interfere with the display of the display unit 28 and is attached to the upper layer of the display surface of the display unit 28. The input coordinates on the touch panel 70*a* and the display coordinates on the display screen of the display unit 28 are associated with each other. Thereby, a graphical user interface (GUI) can be provided as if the user could directly operate the screen displayed on the display unit 28.

Figure 3A:
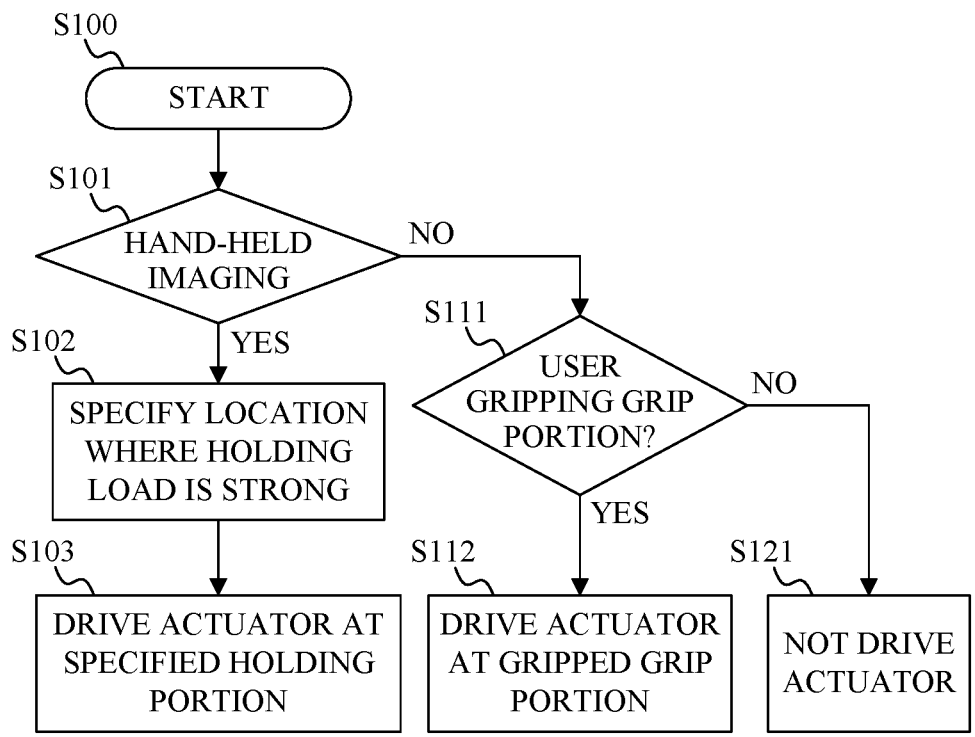
FIGS. 3A and 3B are a flowchart and an explanatory diagram illustrating an operation of the image pickup apparatus according to the first embodiment.
Figure 3B:
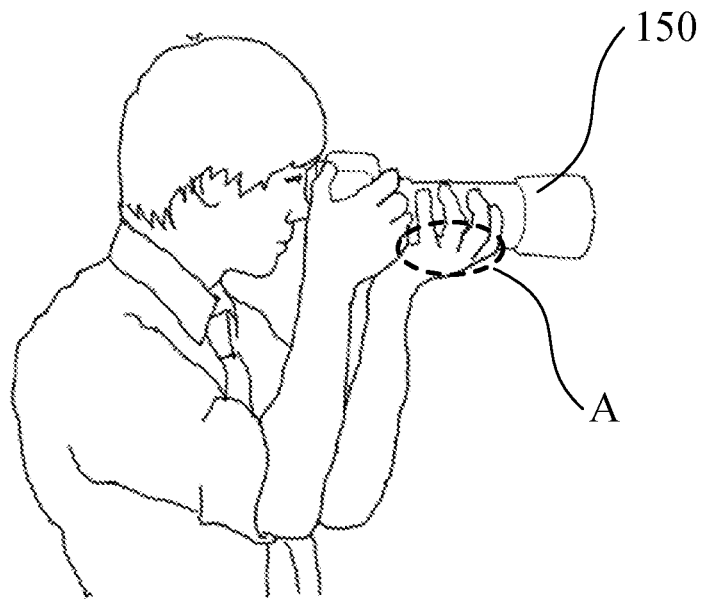

Referring now to FIGS. 3A and 3B, a description will be given of the operation in a case where the image pickup apparatus 1 according to this embodiment notifies the user. This embodiment notifies the user of imaging by vibration in a case where the user performs an imaging operation, but the disclosure is not limited to this example. FIG. 3A is a flowchart illustrating the operation of the image pickup apparatus 1. In a case where the user operates the shutter button 61, the system control unit 50 starts a control flow in step S100.

First, in step S101, the system control unit 50 uses the orientation detector 55 to determine whether or not the user is imaging with the image pickup apparatus 1 in a hand-held state. In a case where it is determined to be hand-held imaging, the flow proceeds to step S102. In step S102, the system control unit 50 identifies a portion of the grip portion 90 where the holding load is strong (grip portion 90*a* or grip portion 90*b*). In this embodiment, the system control unit 50 detects the load on the grip portion (grip portion 90) using the vibration device 100. As described above, the vibration device 100 converts an electrical signal into mechanical vibration. In a case where an external force is applied to the grip portion 90 on which the vibration device 100 is disposed, the electric signal changes. The load applied to the grip portion 90 can be measured by measuring the voltage and current values of the vibration device 100. A dedicated sensor for detecting the load may be provided separately from the vibration device 100. In a case where the location where the holding load is strong is identified, in step S103, the system control unit drives the actuator (vibration device 100) of the identified holder (grip portion or another grip portion).

Due to this control, even if the image pickup apparatus 1 includes a plurality of grip portions, only the portion of the vibration device 100 at a position strongly gripped by the user can be driven and the user can be surely notified. Power consumption can be suppressed because the vibration device 100 at a portion that is not gripped by the user or that is weakly touched by the user is not driven. Since the portion strongly gripped by the user is exclusively vibrated, vibrating a plurality of grip portions does not prevent the user from concentrating on imaging. Since the grip portion strongly gripped by the user vibrates where the image pickup apparatus 1 and the hand of the user contact each other, the energy required for vibration can be kept low, power consumption is reduced, and the device life can become longer.

In a case where it is determined in step S101 that the hand-held imaging is not performed, the flow proceeds to step S111. In step S111, the system control unit determines whether or not the user is gripping the grip portion 90. In a case where it is determined that the user is gripping the grip portion 90, the flow proceeds to step S112. In step S112, the system control unit 50 drives the actuator of the grip portion gripped by the user. This corresponds, for example, to a state in which the user holds the grip portion 90 with the image pickup apparatus 1 attached to a tripod.

In a case where it is determined in step S111 that the grip portion is not gripped, the flow proceeds to step S121. In step S121, the system control unit 50 does not drive any actuators. Due to this control, even if the user attaches the image pickup apparatus 1 to the tripod or the like, the grip portion 90 held by the user is vibrated, and the vibration device 100 is not vibrated in a case where the user is not touching the grip portion. Therefore, efficient notification can be performed with suppressed power consumption.

The target to be detected of the gripping state of the user is not limited to the grip portion 90 of the image pickup apparatus 1. As illustrated in FIG. 3B, the vibration device 100 may be disposed using a holding portion A of the lens apparatus 150 as a grip portion. Due to this configuration, in a case where a heavy lens is attached, a portion is vibrated where the lens apparatus 150 is held and a large load is applied, so efficient notification can be performed. In this embodiment, the shutter buttons 61a and 61b may be configured to determine the gripping states of a plurality of grip portions by the user.

Figure 4:
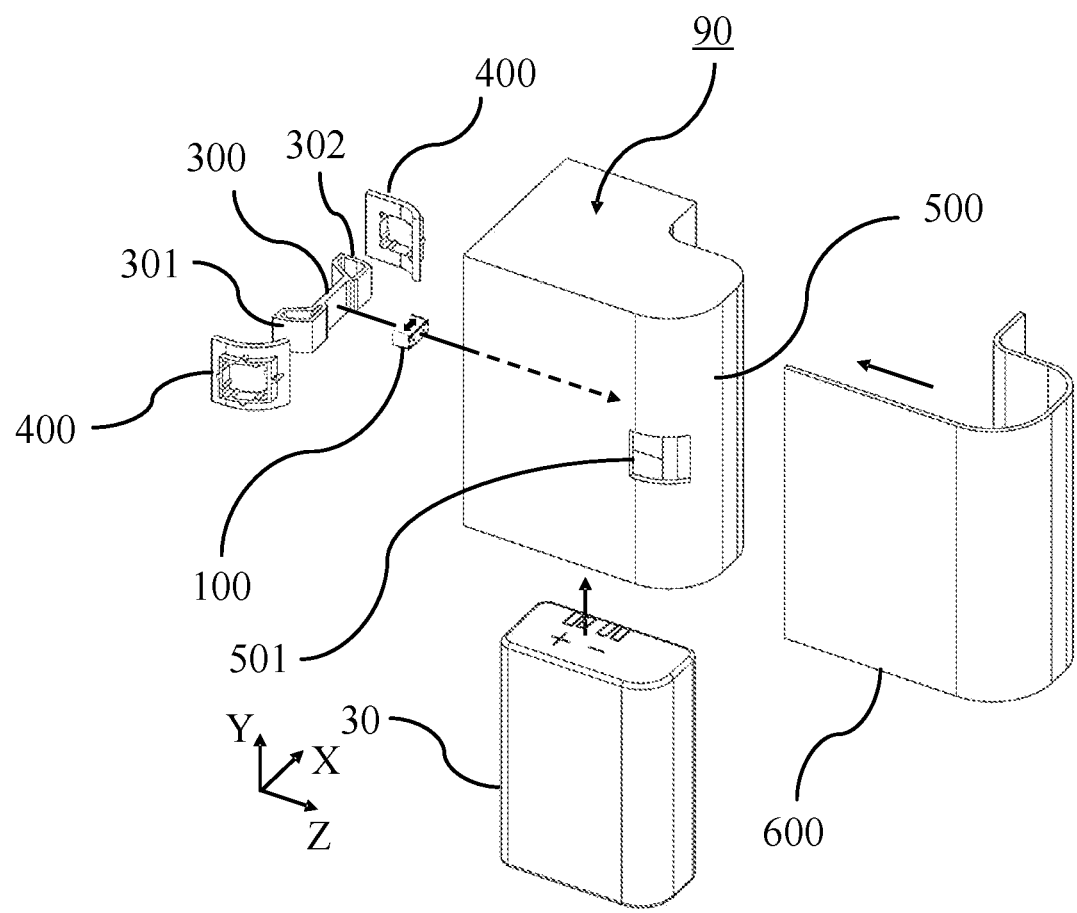
FIG. 4 is an exploded perspective view illustrating a structure for holding a vibrating device attached to a grip portion according to the first embodiment.

Referring now to FIG. 4, a description will be given of a configuration for holding the vibration device 100 on the grip portion 90 of the image pickup apparatus according to this embodiment. FIG. 4 is an exploded perspective view illustrating a holding structure for the vibration device 100 attached to the grip portion 90 of the image pickup apparatus 1. In FIG. 4, for convenience, the following description uses the terms an X direction, a Y direction, and a Z direction that indicate a coordinate system. This is similarly applicable to descriptions of other drawings in which the coordinate system is described.

The vibration device 100 includes a linear resonant actuator (LRA), a piezoelectric element, or a VC motor, as described above, and vibrates in the arrow direction (X direction) in FIG. 4. The vibration device 100 is electrically connected to the system control unit 50 using a flexible printed circuit board or a lead wire (not illustrated). A holder 300 holds the vibration device 100 and is made of a metal with low damping of vibration or a molding material with high rigidity so as to easily transmit the vibration generated by the vibration device 100. The holder 300 includes a first vibrating portion 301 and a second vibrating portion 302 for transmitting vibrations generated by the vibration device 100 to the user. The first vibrating portion 301 and the second vibrating portion 302 are disposed at different positions on the grip portion 90. The first vibrating portion 301 and the second vibrating portion 302 may be disposed opposite to each other.

A vibration damping member (damper unit) 400 is molded (formed) using a rubber material such as silicone rubber that has an effect of damping the vibration generated by the vibration device 100. The vibration damping member 400 includes protrusions 401 protruding to the outer circumference side and protrusions 402 protruding to the inner circumference side (see FIG. 7). The vibration damping member 400 can be made of any material other than the rubber materials such as silicon rubber, as long as the vibration generated by the vibration device 100 can be damped by a damper structure having a damping effect or a vibration isolation or damping structure.

A cover member 500 constitutes at least part of the grip portion 90. The cover member 500 is molded from a highly rigid magnesium alloy or molding material so that the main shape of the grip portion 90 is not deformed even if the user strongly grips it. The cover member 500 has an opening (first opening) 501 and an opening (second opening) 502 at positions where the palm and fingertips of the user gripping the grip portion 90 touch (FIGS. 5A and 5B).

Figure 5A:
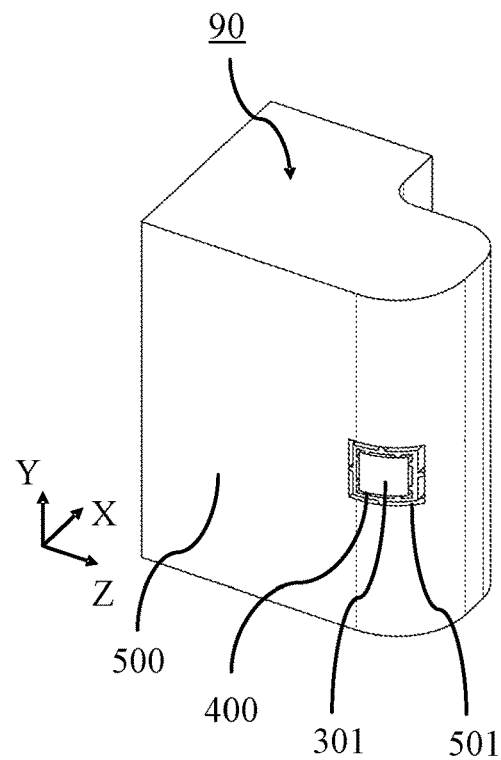
FIGS. 5A and 5B are perspective views illustrating a holding structure for a vibrating device attached to a grip portion according to the first embodiment.
Figure 5B:
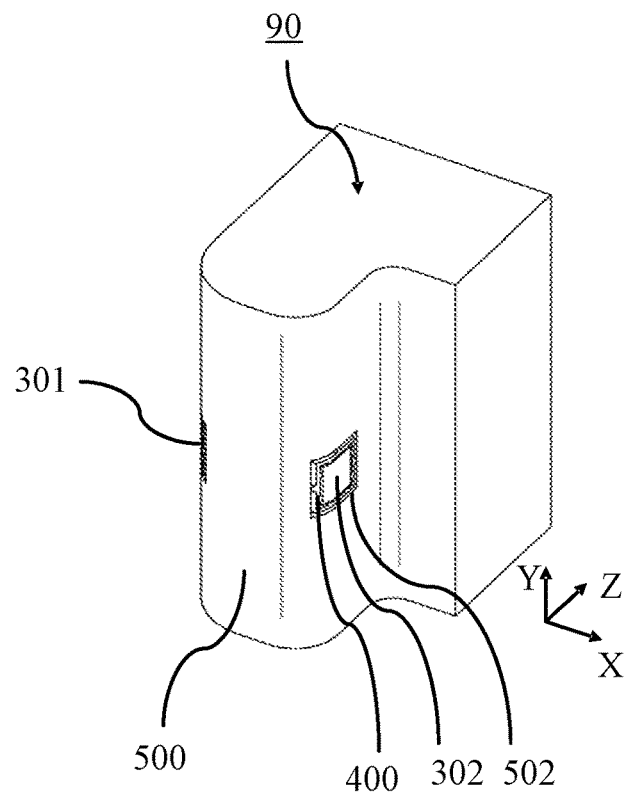
Figure 6A:
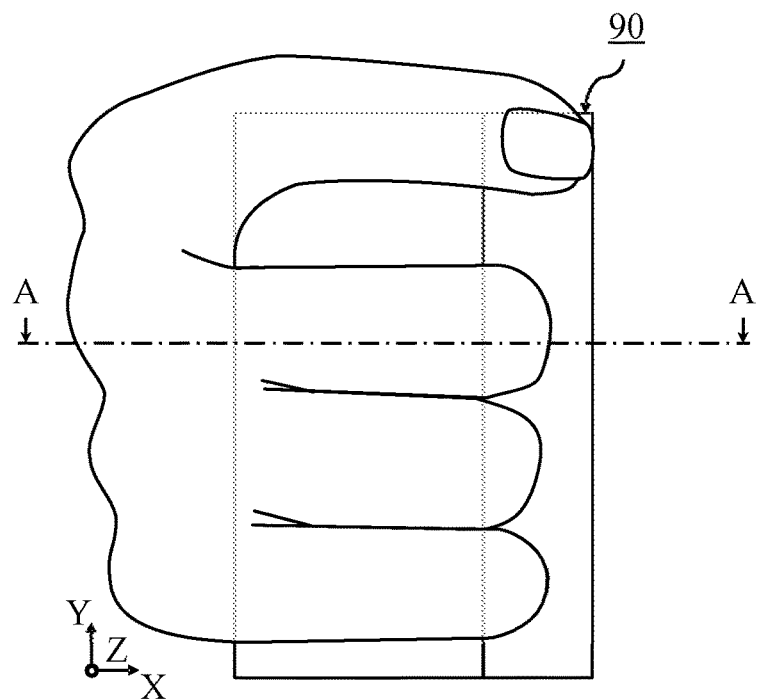
FIGS. 6A and 6B explain that a user holds the grip portion according to the first embodiment.
Figure 6B:
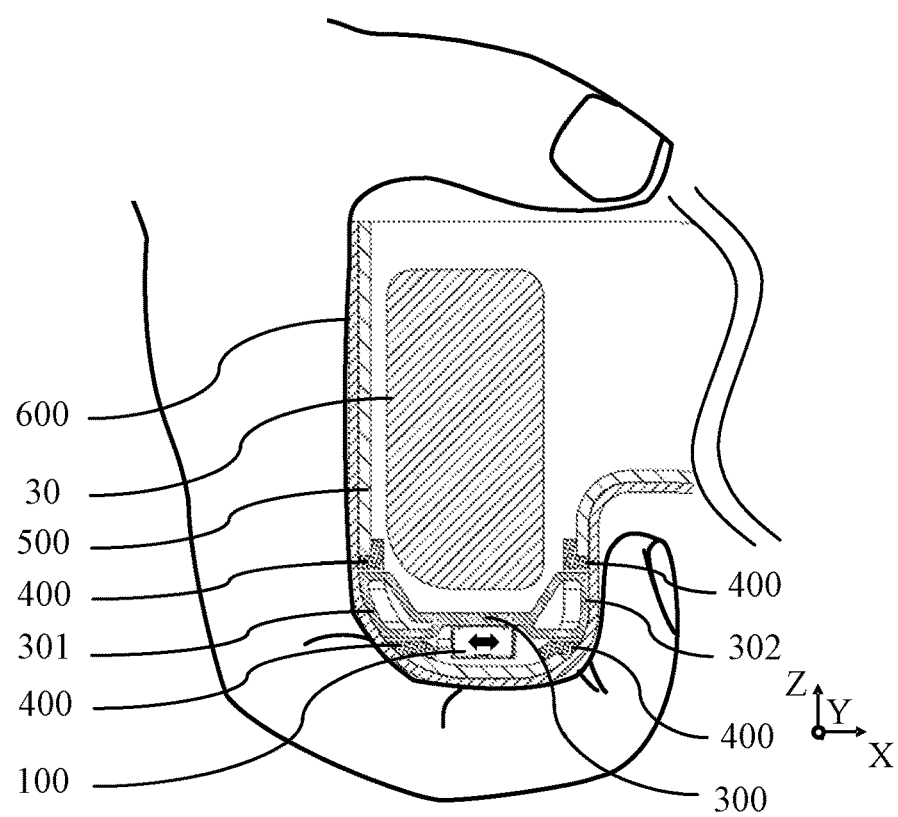
Figure 7:
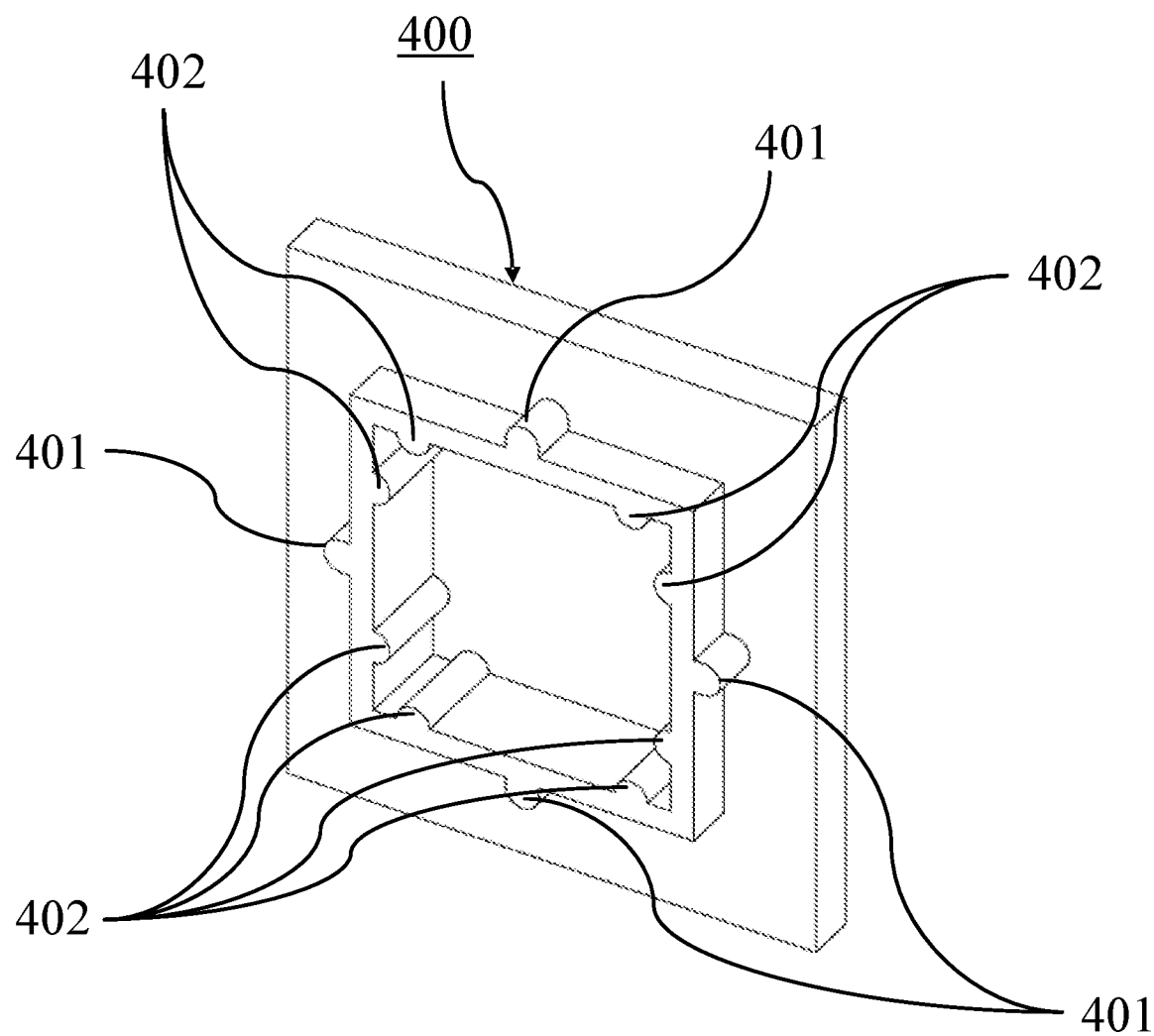
FIG. 7 is a front perspective view of a vibration damping member according to the first embodiment.

Referring now to FIGS. 5A to 7, a description will be given of a state in which the vibration device 100 is attached to the grip portion 90 of the image pickup apparatus 1 according to this embodiment, and a state in which the user grips the grip portion 90. FIGS. 5A and 5B are perspective views illustrating a holding structure for the vibration device 100 attached to grip portion 90. FIG. 6A is a front view in a case where the user grips the grip portion 90. FIG. 6B is a sectional view illustrating an A-A section in FIG. 6A. FIG. 7 is a front perspective view of the vibration damping member 400.

As illustrated in FIGS. 5A, 5B, and 6B, the vibration device 100 is fixed to approximately the center of each of the first vibrating portion 301 and the second vibrating portion 302 of the holder 300 with unillustrated double-sided tape. The holder 300 is held by the openings 501 and 502 in the cover member 500 via the vibration damping member 400. In this embodiment, the first vibrating portion 301 is held in the opening 501 through the vibration damping member (first damper unit) 400, and the second vibrating portion 302 is held in the opening 502 through the vibration damping member (second damper unit) 400.

A description will now be given of a state in which the user grips the grip portion 90. As illustrated in FIGS. 6A and 6B, the user feels the vibration generated by the vibration device 100 by touching the first vibrating portion 301 and the second vibrating portion 302 via a grip rubber 600 in gripping the grip portion 90. That is, in a case where the user grips the grip portion 90, the user can hold the first vibrating portion 301 of the holder 300 with his palm and the second vibrating portion 302 with his fingertips. Thereby, the user can feel the vibration generated by the vibration device 100. The A-A sectional view of FIG. 6B corresponds to a sectional view of the protrusions 401 protruding to the outer circumference side at the central position of the vibration damping member 400 illustrated in FIG. 7. A gap exists between the vibration damping member 400 and the holder 300 (each of the first vibrating portion 301 and the second vibrating portion 302). As illustrated in FIG. 7, the holder 300 is held by the protrusions 402 projecting inwardly from the vibration damping member 400.

In the above configuration, in a case where the user grips the grip portion 90, the holder 300 may be located inside the grip portion 90 rather than the surface of the cover member 500 depending on how the user grips the grip portion or variations in component dimensions during manufacturing. The holder 300 is held by the vibration damping member 400 in the Y and Z directions, but is not restricted in the X direction because the vibration damping member 400 contacts the grip rubber 600. Then, the user cannot touch the first vibrating portion 301 and the second vibrating portion 302 of the holder 300, and the vibration generated by the vibration device 100 may not be transmitted to the palm or fingertips. Accordingly, a description will be given of one characteristic of this embodiment relating to the restriction of the holder 300 in the X direction.

As illustrated in FIG. 6B, in a case where the user grips the grip portion 90, the holder 300 is held so as to move back and forth in a direction (gripping direction, X direction) in which the grip portion 90 is gripped by the fingertips and the palm illustrated in the sectional view of the grip portion 90. A moving amount of the holder 300 is restricted by a deformation amount of the grip rubber 600 covering the cover member 500. In this embodiment, a movable amount of the holder 300 can be adjusted by changing the rubber hardness of the grip rubber 600.

In a case where the holder 300 is attached to the cover member 500 via the vibration damping member 400, the first vibrating portion 301 and the second vibrating portion 302 may be projected from the openings 501 and 502 of the cover member 500 by about 0.1 mm to 1.0 mm in the X direction. Thereby, in a case where the user grips the grip portion 90, the first vibrating portion 301 and the second vibrating portion 302 always protrude from the openings 501 and 502, so that the vibration generated by the vibration device 100 can be transmitted to a plurality of locations such as the fingertips or palm of the user.

In restricting the holder 300 from moving in the X direction, part of the shape of the holder 300 may have an unillustrated engagement portion that serves as a stopper extending in at least one of the Z direction and the Y direction in FIG. 6B. In this embodiment, the movable amount of the holder 300 may be adjusted by bringing such a locking portion into contact with the vibration damping member 400.

In a case where the user grips the grip portion 90 and feels the vibration generated by the vibration device 100, the user may feel uncomfortable if the vibration is felt differently depending on the palm or fingertips. Accordingly, a description will be given of one characteristic of this embodiment that allows the vibration generated by the vibration device 100 to be easily transmitted equally to a plurality of locations such as the palm and fingertips of the user.

As illustrated in FIG. 6B, the vibration device 100 may be fixed to the approximate center of each of the first vibrating portion 301 and the second vibrating portion 302 of the holder 300 with unillustrated double-sided tape. At least one of the width, thickness, and length of the holder 300 may be changed in order to equally transmit the vibration of the vibration device 100 to the palm and fingertips of the user. In this embodiment, since the first vibrating portion 301 is touched by the palm and the second vibrating portion 302 is touched by the fingertip via the grip rubber 600, the vibration generated by the vibration device 100 may be less likely to be felt by the palm than by the fingertip. In this case, the surface of the first vibrating portion 301 that the user touches via the grip rubber 600 may have unevenness (not illustrated) to increase the friction coefficient to change the transmission manner of the vibration and to make it easier for the vibration to be transmitted to the hand. Thereby, the vibration generated by the vibration device 100 can be transmitted to the palm or fingertips of the user while the user feels less uncomfortable at his palm and fingertips.

The grip rubber 600 also serves to damp vibration and prevents the vibration from each of the first vibrating portion 301 and the second vibrating portion 302 from transmitting to the internal structure of the image pickup apparatus 1 via the vibration damping member 400 and the grip portion 90. Therefore, this embodiment can restrict the vibration from transmitting to various devices of the image pickup apparatus 1, and restrain the performance of the gyro sensor or the image stabilizing mechanism of the image pickup apparatus 1 from deteriorating due to the vibration transmission. The vibration generated by the vibration device 100 can be prevented from being transmitted to the image sensor 22 during still or moving image capturing and a captured image can be prevented from blurring.

Referring now to FIGS. 4 and 6B, a description will be given of one characteristic of this embodiment for disposing the vibration device 100 in the grip portion 90 of the image pickup apparatus 1 with good space efficiency. As illustrated in FIG. 4, the power supply unit 30 such as a battery is detachably attached inside the grip portion 90 of the image pickup apparatus 1. As illustrated in FIG. 6B, the vibration device 100 may be fixed between the holder 300 and the cover member 500 with unillustrated double-sided tape in order to secure the accommodation space for the power supply unit 30. This structure can use a large-capacity battery without affecting the space in which the power supply unit 30 is installed.

In an electronic apparatus that includes an image sensor 22 and an orientation detector 55 such as an acceleration sensor or a gyro sensor, like the image pickup apparatus 1, the vibration generated by the vibration device 100 may cause blur of a captured image or abnormal control of the orientation detector 55. Accordingly, referring now to FIGS. 6B and 7, a description will be given of a configuration that restrains the vibration generated by the vibration device 100 from being transmitted to the image pickup apparatus 1.

As illustrated in FIG. 6B, the vibration generated by the vibration device 100 vibrates in the arrow direction (X direction), and vibrations are transmitted from the first vibrating portion 301 and the second vibrating portion 302 through the holder 300 to the palm and fingertips of the user, respectively. The vibration generated by the vibration device 100 is transmitted to the first vibrating portion 301 and the second vibrating portion 302 as irregular vibration including vector components in the X, Y, and Z directions due to the distorted shape of the holder 300 and the position of the gravity center. Therefore, the vibration damping member 400 may damp not only the vibration in the X direction but also the vibration in the Y and Z directions so that the image pickup apparatus 1 does not easily receive the vibration.

As illustrated in FIG. 7, the vibration damping member 400 includes the protrusions 401 protruding to the outer circumference side and the protrusions 402 protruding to the inner circumference side. In a case where the protrusions 401 protruding to the outer circumference side and the protrusions 402 protruding to the inner circumference side are disposed at the same position in the circumferential direction, the vibration transmission path may be shortened and the damping effect of the vibration damping member 400 may be reduced. Hence, in this embodiment, the protrusions 401 protruding to the outer circumference side and the protrusions 402 protruding to the inner circumference side may be alternated. Alternating the protrusions 401 protruding to the outer circumferential side and the protrusions 402 protruding to the inner circumference side can extend the transmission path of the vibration generated by the vibration device 100 and enhance the damping effect of the vibration. Alternately arranging the protrusions 402 protruding toward the inner circumference side and the protrusions 401 protruding toward the outer circumference side of the vibration damping member 400 can restrain the vibration generated by the vibration device 100 from being transmitted to the cover member 500 (image pickup apparatus 1). In this embodiment, for the same purpose as described above, the vibration damping member 400 is described as a separate part using a material such as silicon rubber, but it may be formed with the cover member 500 using elastomer or the like by two-color molding.

In a case where the unillustrated double-sided tape that fixes the grip rubber 600 comes into contact with the first vibrating portion 301 and the second vibrating portion 302, the vibration generated by the vibration device 100 may be transmitted to the cover member 500 (image pickup apparatus 1) through the double-sided tape. Therefore, this embodiment may not fix the first vibrating portion 301 and the second vibrating portion 302 of the holder 300 with the double-sided tape that fixes the grip rubber 600. Thereby, the vibration generated by the vibration device 100 is less likely to be transmitted to the grip rubber 600 through the double-sided tape, so that the vibration is less likely to be transmitted to the cover member 500 (image pickup apparatus 1) to which the grip rubber 600 is fixed with the double-sided tape.

In this embodiment, the thickness of the grip rubber 600 facing the first vibrating portion 301 and the second vibrating portion 302 may be reduced. Thereby, a configuration in which the vibration generated by the vibration device 100 is more easily transmitted to the palm and fingertips in a case where the user grips the grip portion 90.

In this embodiment, in other words, the grip portion 90 includes a first vibration area and a second vibration area each having a transmission structure (300, 301, and 302) for transmitting the vibration generated by the vibration device 100, and a non-vibrating area having no transmission structure. The first vibration area and the second vibration area are areas where the openings 501 and 502 are formed in the grip portion 90 or areas where the first vibrating portion 301 and the second vibrating portion 302 are located. The non-vibrating area corresponds to an area where the openings 501 and 502 are not formed in the grip portion 90 or an area other than the area where the first vibrating portion 301 or the second vibrating portion 302 is disposed.

The grip portion 90 may include the vibration damping member 400 disposed around the transmission structure for the vibration, and the vibration damping member 400 may reduce the vibration transmitted from each of the first vibration area and the second vibration area to the non-vibration area. The transmission structure may include a holder 300 holding the vibration device 100, and the holder 300 may include the first vibrating portion 301 disposed in the first vibration area and the second vibrating portion 302 disposed in the second vibration area.

Second Embodiment

Figure 8:
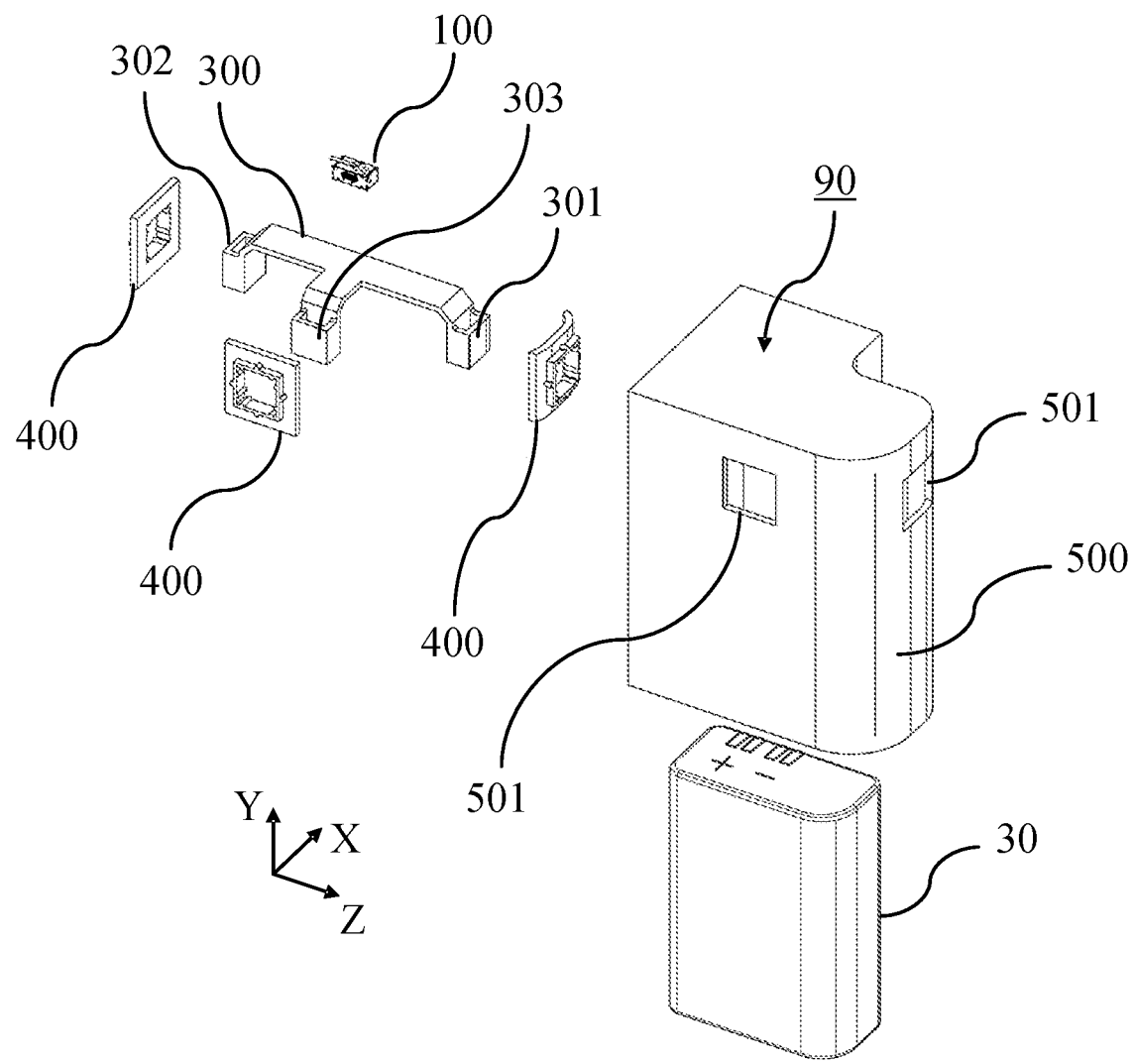
FIG. 8 is an exploded perspective view illustrating a holding structure for a vibrating device attached to a grip portion according to a second embodiment.
Figures 9A, 9B:
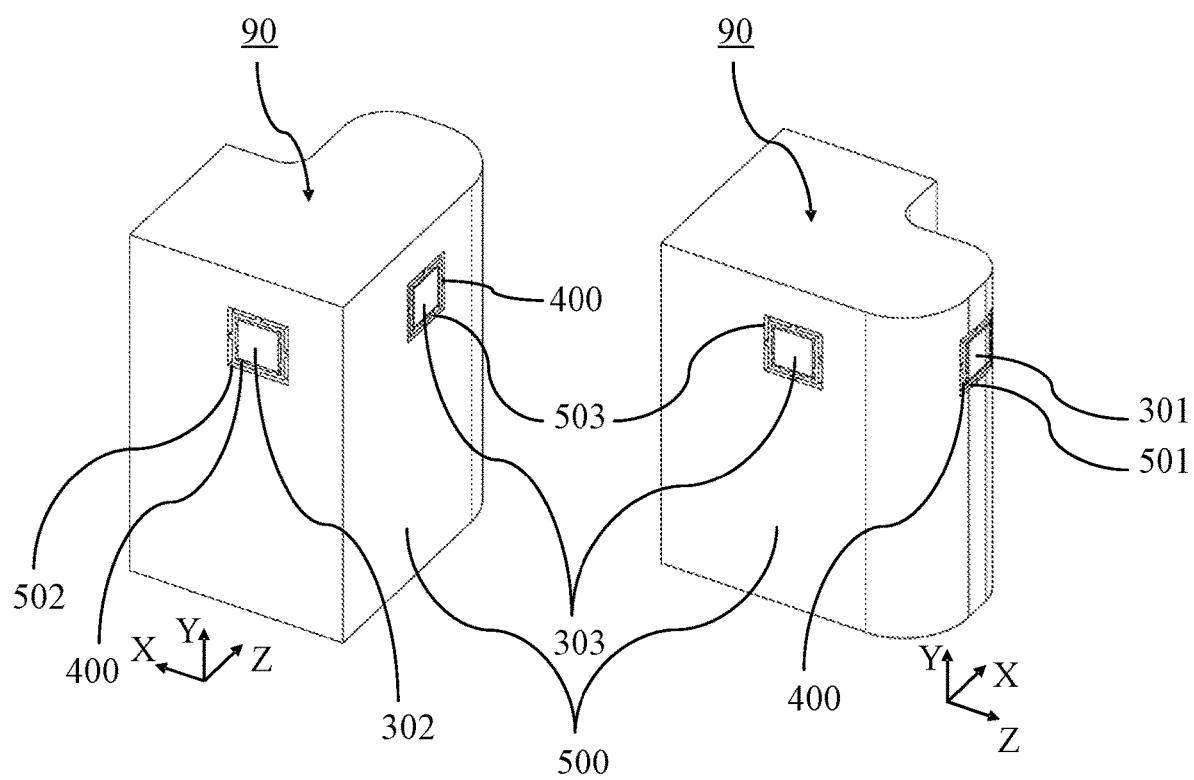
FIGS. 9A and 9B are perspective views illustrating the holding structure for the vibrating device attached to the grip portion according to the second embodiment.

Referring now to FIGS. 8, 9A, and 9B, a description will be given of a second embodiment according to the present disclosure. In this embodiment, a description of the configuration similar to that of the first embodiment will be omitted.

The image pickup apparatus (electronic apparatus) 1 according to this embodiment has a configuration in which, in a case where the user grips the grip portion 90 of the image pickup apparatus 1, the user can feel the vibration in at least three locations: the middle finger, the palm, and the thumb. While this embodiment will discuss a configuration having three vibrating portions, the disclosure is not limited to this embodiment, and the configuration may include four or more vibrating portions. FIG. 8 is an exploded perspective view illustrating a holding structure for the vibration device 100 attached to the grip portion 90 according to this embodiment. FIGS. 9A and 9B are perspective views illustrating the holding structure for the vibration device 100 attached to the grip portion 90. FIG. 9A is a rear perspective view. FIG. 9B is a front perspective view.

In this embodiment, the holder 300 includes a first vibrating portion 301, a second vibrating portion 302, and a third vibrating portion 303. The first vibrating portion 301, the second vibrating portion 302, and the third vibrating portion 303 are engaged with and held by the openings 501, 502, and 503 of the cover member 500 via the vibration damping member 400, respectively. In this embodiment, the user can touch the first vibrating portion 301, the second vibrating portion 302, and the third vibrating portion 303 via the grip rubber 600, similarly to the first embodiment.

In a case where the user grips the grip portion 90 of the image pickup apparatus 1, the middle finger touches the first vibrating portion 301, the thumb touches the second vibrating portion 302, and the palm touches the third vibrating portion 303. The vibration device 100 may be fixed to an approximate center portion of each of the first vibrating portion 301, the second vibrating portion 302, and the third vibrating portion 303 of the holder 300 with unillustrated double-sided tape. Thereby, the vibrations of the first vibrating portion 301, the second vibrating portion 302, and the third vibrating portion 303 tend to become equal, and the user can feel the vibrations from a plurality of points on the palm and fingertips while the user is less likely to feel uncomfortable. In order to equally transmit the vibration generated by the vibration device 100, the shape of the holder 300 such as width, thickness, or length may be changed.

A description will now be given of the direction of the vibration generated by the vibration device 100 and the characteristics of the surface states of the first vibrating portion 301, the second vibrating portion 302, and the third vibrating portion 303. As illustrated in FIG. 8, the direction of the vibration generated by the vibration device 100 according to this embodiment is the Z direction, and the vibrations of the first vibrating portion 301 and the second vibrating portion 302 are the same as the gripping direction of the user. At this time, the user differently feels the vibrations from the first vibrating portion 301 and second vibrating portion 302, and the vibration from the third vibrating portion 303, which are transmitted to his hand. Alternatively, the vibration from the third vibrating portion 303 may be less likely to transmit to the user than the vibrations from the first vibrating portion 301 and second vibrating portion 302. In this case, the surface of the third vibrating portion 303 may have unevenness (not illustrated) to increase the friction coefficient so that the vibration becomes more easily transmitted to the hand of the user.

Due to this configuration, for example, in a case where the vibrating directions of the vibration device 100 are different, four or more vibrating portions of the holder 300 are provided, or the transmission manner of the vibration is changed depending on the part of the hand of the user, the vibration can be more easily transmitted to the user.

Variation

Referring now to FIGS. 10A to 15, a description will be given of variations in which the configurations of the above embodiments are applied to various electronic apparatus.

Figure 10A:
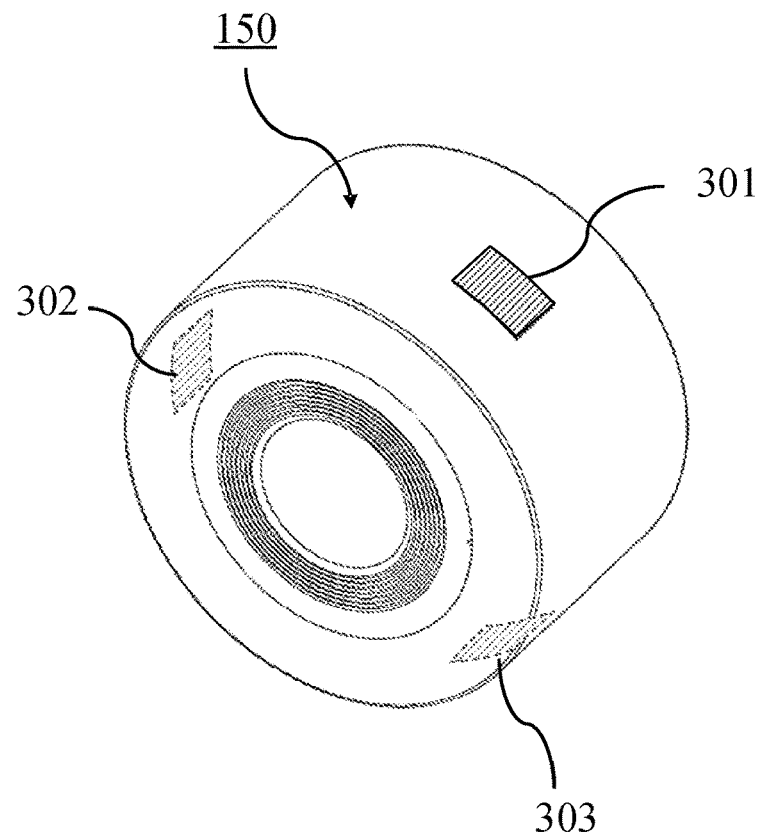
FIGS. 10A and 10B explain a lens apparatus according to a variation according to each embodiment.
Figure 10B:
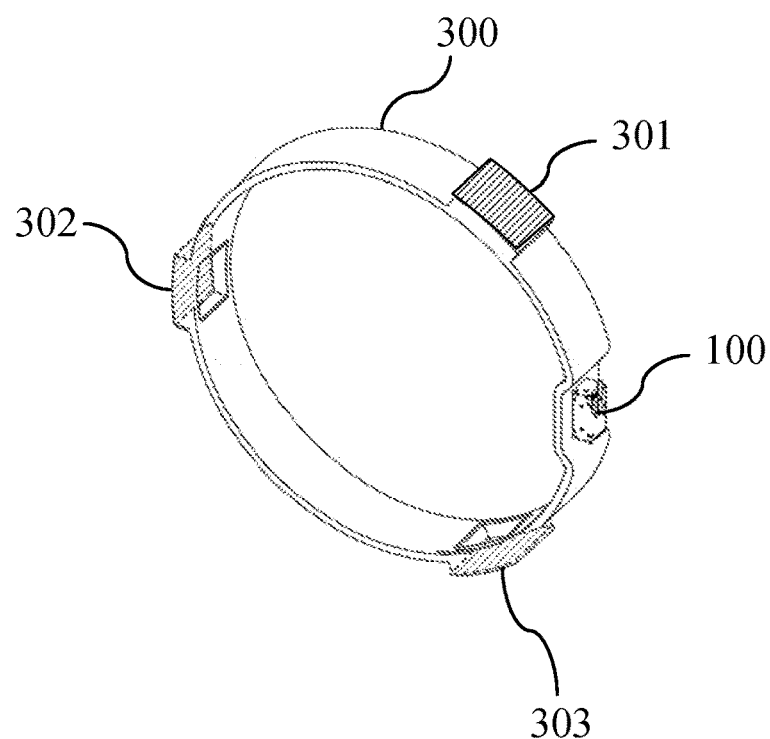

FIGS. 10A and 10B explain a lens apparatus (lens unit) 150 according to one variation of each embodiment. The lens apparatus 150 is a lens unit for a lens interchangeable type camera. FIG. 10A illustrates a perspective view of the lens apparatus 150. FIG. 10B illustrates a perspective view of the holder 300 that holds the vibration device 100. The lens apparatus 150 includes the vibration device 100 and is fixed to the holder 300 with unillustrated double-sided tape. The holder 300 includes a first vibrating portion 301, a second vibrating portion 302, and a third vibrating portion 303. Due to this configuration, the vibration generated by the vibration device 100 is less likely to be transmitted to the optical member, and the vibration generated by the vibration device 100 can be transmitted to the user holding the lens apparatus 150.

Figure 11A:
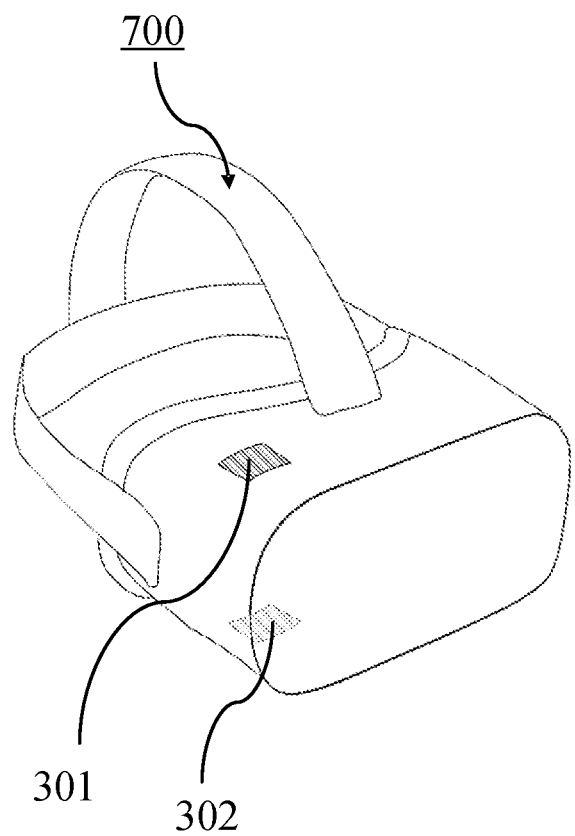
FIGS. 11A and 11B explain a head mount display according to a variation of each embodiment.
Figure 11B:
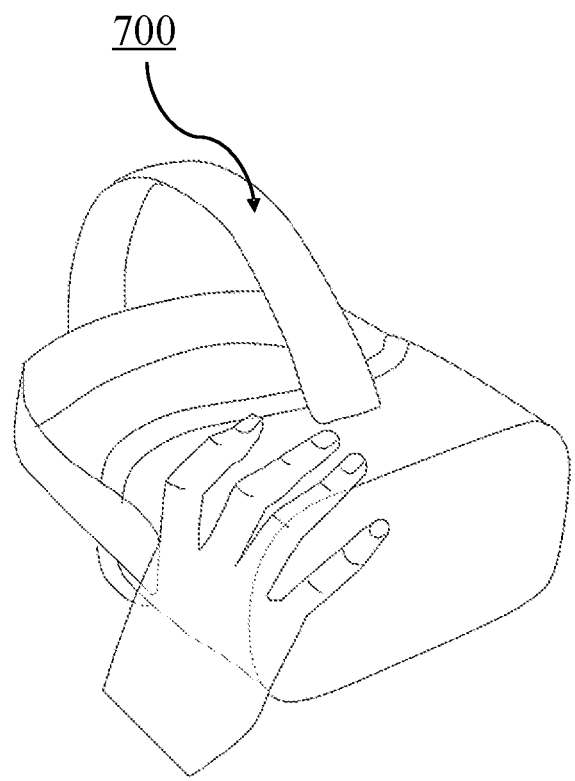

FIGS. 11A and 11B explain a head mount display 700 according to another modification of each embodiment. As illustrated in FIG. 11A, the head mount display 700 includes a first vibrating portion 301 and a second vibrating portion 302. The first vibrating portion 301 and the second vibrating portion 302 are disposed opposite to each other, for example. FIG. 11B illustrates an example of how the user grips the head mount display 700. In a case where the user wears the head mount display 700 and a notification is given by the vibration generated by the vibration device 100, the user may feel uncomfortable if the entire head mount display 700 is vibrated.

Accordingly, as illustrated in FIG. 11B, the user gripping the head mount display 700 can feel vibrations generated by the vibration device 100 at a plurality of locations on the hand of the user via the first vibrating portion 301 and the second vibrating portion 302. This variation has given a description on the premise that the vibration is transmitted to the hand of the user holding the head mount display 700, but at least one of the first vibrating portion 301 and the second vibrating portion 302 may contact part of the head of the user. Due to this configuration, the user wearing the head mount display 700 on the head can feel notification by vibration generated by the vibration device 100.

Figure 12A:
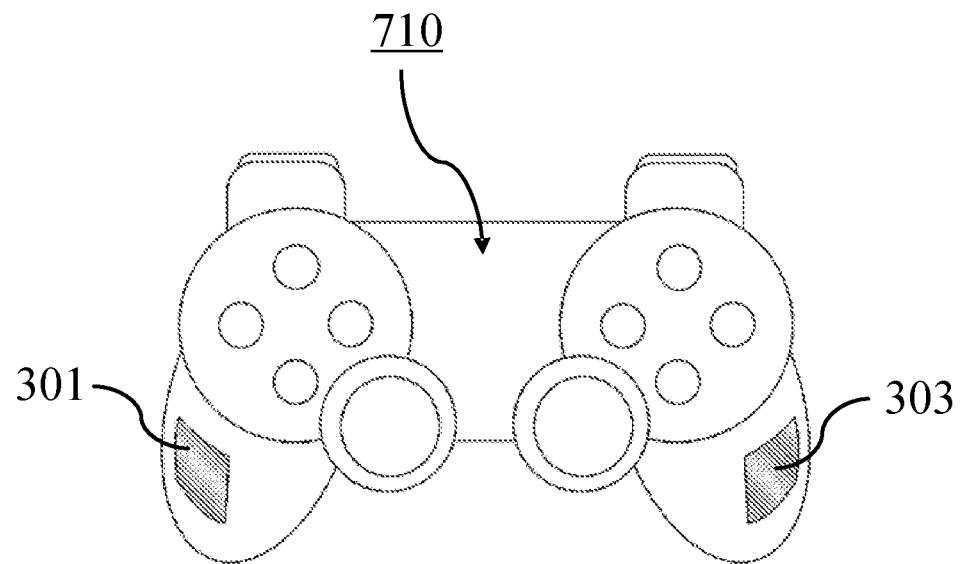
FIGS. 12A and 12B explain a controller according to a variation of each embodiment.
Figure 12B:
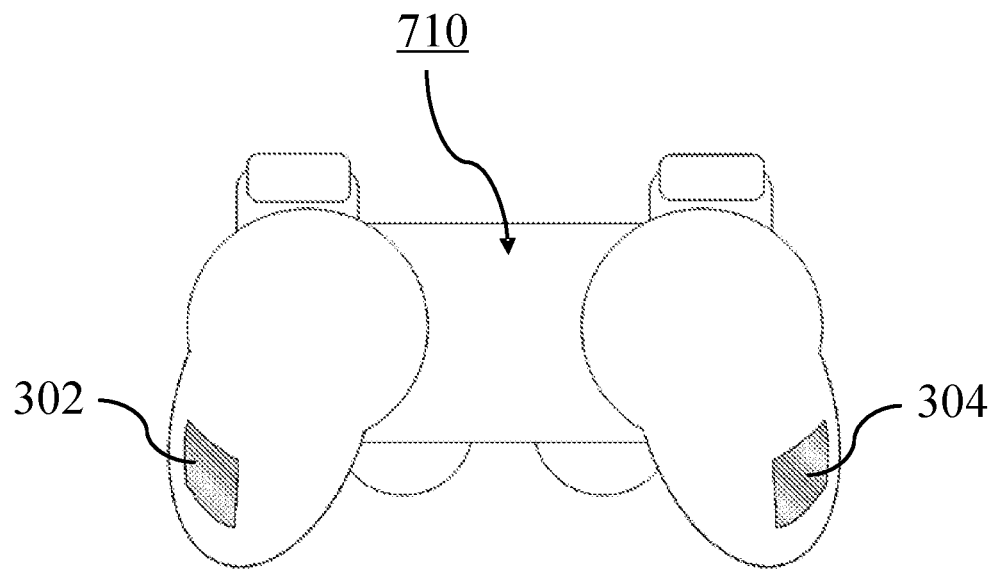

FIGS. 12A and 12B explain a controller (game controller) 710 according to still another variation of each embodiment. FIG. 12A illustrates a front view of the controller 710. FIG. 12B illustrates a rear view of the controller 710. The controller 710 includes a first vibrating portion 301, a second vibrating portion 302, a third vibrating portion 303, and a fourth vibrating portion 304.

It is a well-known technology to vibrate the entire controller by installing a vibration device in the controller, but since the entire controller vibrates, the user may have difficulty in operating buttons and joysticks during vibration. According to the controller 710 in this variation, vibration is less likely to be transmitted to parts of the controller other than each vibrating portion. Therefore, the user can comfortably operate the buttons of the game controller or the joystick while feeling the vibration generated by the vibration device 100.

Figures 13A, 13B:
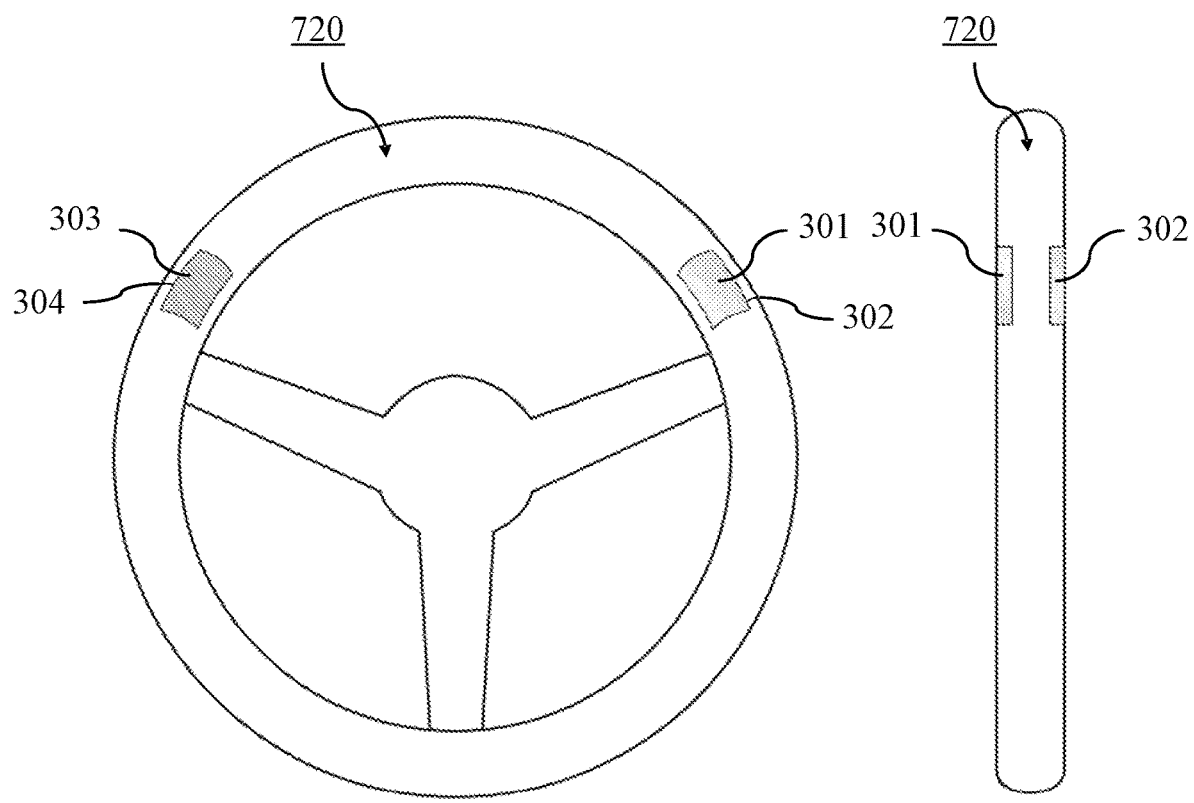
FIGS. 13A and 13B explain a steering wheel according to a variation of each embodiment.

FIGS. 13A and 13B explain a steering wheel 720 of an automobile according to another variation of each embodiment. FIG. 13A illustrates a front view of the steering wheel 720. FIG. 13B illustrates a side view of the steering wheel 720. As illustrated in FIG. 13A, the steering wheel 720 includes a first vibrating portion 301 and a third vibrating portion 303. As illustrated in FIG. 13A, a second vibrating portion 302 is disposed in the depth direction of the paper plane of the first vibrating portion 301, and similarly a fourth vibrating portion 304 is disposed in the depth direction of the paper plane of the third vibrating portion 303. That is, as illustrated in FIG. 13B, when viewed from the side, the second vibrating portion 302 is disposed on the opposite side of the first vibrating portion 301 (the first vibrating portion 301 and the second vibrating portion 302 are disposed opposite to each other). This is similarly applicable to the arrangement relationship between the third vibrating portion 303 and the fourth vibrating portion 304.

In a case where the vibration generated by the vibration device 100 in operating the steering wheel of the automobile extends to the entire steering wheel, it may interfere with the driving of the automobile. Accordingly, this variation prevents the vibration from reaching the entire steering wheel 720, and allows the vibration to be locally transmitted to the user. In other words, this variation can notify the user by vibration without interfering with the steering wheel operation during driving. Each vibrating portion illustrated in FIGS. 13A and 13B assumes the home position in a case where the user grips the steering wheel 720, but each vibrating position may be provided at a plurality of locations over the entire steering wheel 720.

Figure 14A:
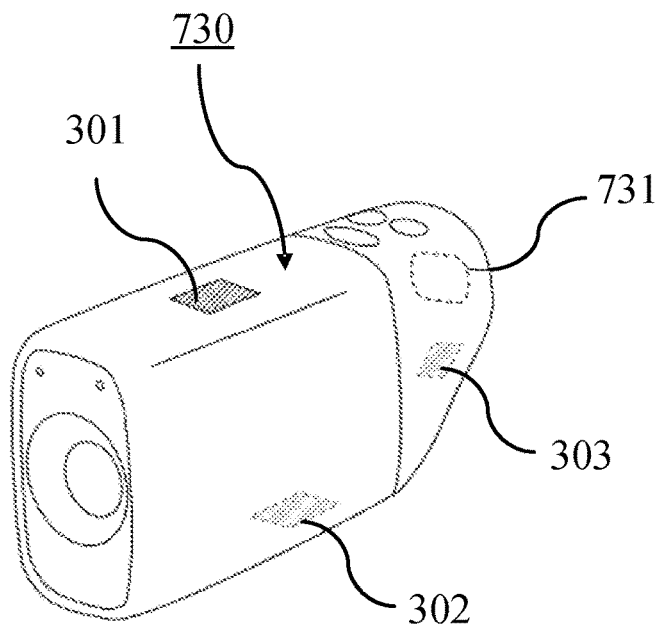
FIGS. 14A and 14B explain a digital monocular according to a variation of each embodiment.
Figure 14B:
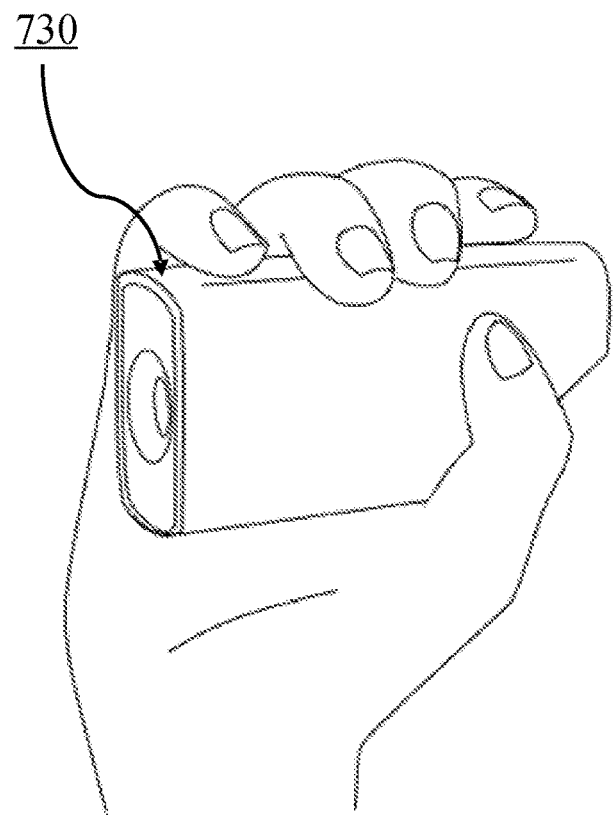

FIGS. 14A and 14B explain a digital monocular 730 according to another variation of each embodiment. FIG. 14A is a front perspective view of the digital monocular 730. FIG. 14B illustrates an example of a gripping method in a case where the user grips the digital monocular 730. The user can hold the digital monocular 730 in his right hand and view a desired digital image through an eyepiece portion 731 of the digital monocular 730. The user can capture an image by performing imaging operation of the digital monocular 730. The digital monocular 730 includes a first vibrating portion 301, a second vibrating portion 302, and a third vibrating portion 303, and can transmit vibrations to the fingertips or palm held by the user. Since vibration is not transmitted to the optical members provided in the digital monocular 730, an excellent captured image can be obtained without vibrational disturbance.

Figure 15:
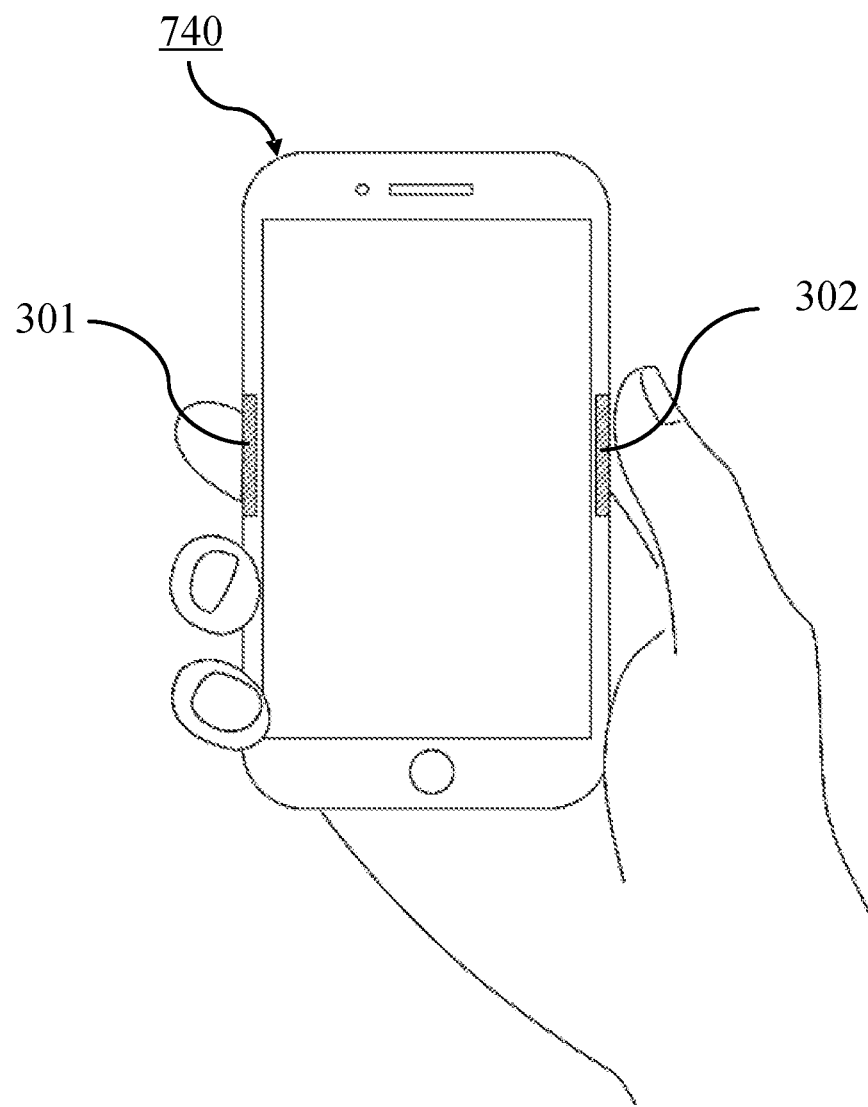
FIG. 15 explains a smartphone according to a variation of each embodiment.

FIG. 15 explains a smartphone 740 according to another variation of each embodiment. The smartphone 740 includes a first vibrating portion 301 and a second vibrating portion 302 at positions held by a user. The first vibrating portion 301 and the second vibrating portion 302 are disposed opposite to each other, for example. This variation can transmit vibrations to the fingertips and palms of the user at locations limited to the first vibrating portion 301 and the second vibrating portion 302 without vibrating the entire smartphone unlike the conventional smartphone.

Each embodiment can provide an electronic apparatus that is less likely to transmit vibration to its entire housing, but can easily transmit vibration to a plurality of gripping positions such as the fingers and palms of the user.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of Japanese Patent Application No. 2022-084604, filed on May 24, 2022, which is hereby incorporated by reference herein in its entirety.

What is claimed is:

1. An electronic apparatus comprising:
   a vibration device configured to vibrate to notify a user of a predetermined state; and
   a grip portion to be gripped by the user,
   a holder configured to hold the vibration device; and
   a damper configured to damp vibration generated by the vibration device,
   wherein the grip portion includes a first vibration area and a second vibration area each having a transmission structure of vibration generated by the vibration device and a non-vibration area having no transmission structure,
   wherein the holder includes a first vibrating portion and a second vibrating portion each configured to transmit the vibration,
   wherein the grip portion includes a cover member,
   wherein the cover member has a first opening and a second opening,
   wherein the damper includes a first damper and a second damper,
   wherein the first vibrating portion is engaged with the first opening via the first damper, and
   wherein the second vibrating portion is engaged with the second opening via the second damper.

2. The electronic apparatus according to claim 1, wherein the grip portion includes the damper disposed around the transmission structure of the vibration, and
   wherein the damper reduces the vibration transmitted from each of the first vibration area and the second vibration area to the non-vibration area.

3. The electronic apparatus according to claim 1, wherein the transmission structure includes the holder, and wherein the first vibrating portion disposed in the first vibration area and the second vibrating portion disposed in the second vibration area.

4. The electronic apparatus according to claim 3, wherein the first vibrating portion and the second vibrating portion are disposed at different positions in the grip portion.

5. The electronic apparatus according to claim 4, wherein the first vibrating portion and the second vibrating portion are disposed opposite to each other.

6. The electronic apparatus according to claim 3, wherein the holder further includes a third vibrating portion disposed at a position different from that of the first vibrating portion and the second vibrating portion.

7. The electronic apparatus according to claim 1, further comprising:
   an image sensor configured to capture an optical image; and
   a control unit configured to control exposure for imaging by the image sensor.

8. The electronic apparatus according to claim 7, wherein the vibration device can vibrate while the image sensor is capturing an image.

9. An electronic apparatus comprising:
   a vibration device configured to vibrate to notify a user of a predetermined state;
   a grip portion to be gripped by the user;
   a holder configured to hold the vibration device; and
   a damper configured to damp vibration generated by the vibration device,
   wherein the holder is engaged with the grip portion via the damper,
   wherein the holder includes a first vibrating portion and a second vibrating portion each configured to transmit the vibration,
   wherein the grip portion includes a cover member,
   wherein the cover member has a first opening and a second opening,
   wherein the damper includes a first damper and a second damper,
   wherein the first vibrating portion is engaged with the first opening via the first damper, and
   wherein the second vibrating portion is engaged with the second opening via the second damper.

10. The electronic apparatus according to claim 9, wherein the first vibrating portion and the second vibrating portion are disposed at different positions in the grip portion.

11. The electronic apparatus according to claim 10, wherein the first vibrating portion and the second vibrating portion are disposed opposite to each other.

12. The electronic apparatus according to claim 9, wherein each of the first vibrating portion and the second vibrating portion protrudes outward from a surface of the cover member, and
   wherein in a case where the user grips the grip portion, each of the first vibrating portion and the second vibrating portion is movable back and forth in a gripping direction.

13. The electronic apparatus according to claim 9, further comprising a sheet member covering the first vibrating portion and the second vibrating portion of the holder and the cover member,
   wherein the first vibrating portion and the second vibrating portion are configured to transmit the vibration to the user via the sheet member.

14. The electronic apparatus according to claim 9, further comprising:
   an image sensor configured to capture an optical image; and
   a control unit configured to control exposure for imaging by the image sensor.

15. The electronic apparatus according to claim 14, wherein the vibration device can vibrate while the image sensor is capturing an image.

* * * * *